(12) United States Patent
Kim

(10) Patent No.: US 11,726,177 B2
(45) Date of Patent: Aug. 15, 2023

(54) APPARATUS AND METHOD FOR ESTIMATING NUMBER OF TARGETS

(71) Applicant: HYUNDAI MOBIS Co., Ltd., Seoul (KR)

(72) Inventor: Young Hoon Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 671 days.

(21) Appl. No.: 16/745,431

(22) Filed: Jan. 17, 2020

(65) Prior Publication Data
US 2020/0233062 A1  Jul. 23, 2020

(30) Foreign Application Priority Data

Jan. 22, 2019  (KR) .................. 10-2019-0007997

(51) Int. Cl.
| | |
|---|---|
| *G01S 7/41* | (2006.01) |
| *G01S 13/931* | (2020.01) |
| *G06N 3/08* | (2023.01) |
| *G01S 7/35* | (2006.01) |
| *G01S 13/04* | (2006.01) |
| *G01S 13/68* | (2006.01) |
| *G06N 3/04* | (2023.01) |
| *G01S 13/44* | (2006.01) |

(52) U.S. Cl.
CPC .............. *G01S 7/417* (2013.01); *G01S 7/354* (2013.01); *G01S 13/04* (2013.01); *G01S 13/931* (2013.01); *G06N 3/08* (2013.01); *G01S 13/44* (2013.01); *G01S 13/68* (2013.01); *G06N 3/04* (2013.01)

(58) Field of Classification Search
CPC .......... G01S 7/417; G01S 7/354; G01S 13/04; G01S 13/931; G01S 13/44; G01S 13/68; G06N 3/08; G06N 3/04
See application file for complete search history.

(56) References Cited

U.S. PATENT DOCUMENTS

| | | | |
|---|---|---|---|
| 5,768,477 A | 6/1998 | Johnson et al. | |
| 2010/0271254 A1* | 10/2010 | Kanamoto | G01S 3/74 342/146 |
| 2016/0223651 A1* | 8/2016 | Kamo | G01S 13/426 |
| 2020/0355817 A1* | 11/2020 | Gillian | G06N 3/08 |
| 2021/0083395 A1* | 3/2021 | Achour | H01Q 3/36 |

FOREIGN PATENT DOCUMENTS

| | | |
|---|---|---|
| CN | 103412290 A * | 11/2013 |
| KR | 10-2017-0075474 | 7/2017 |

* cited by examiner

*Primary Examiner* — Timothy A Brainard
*Assistant Examiner* — Ismaaeel A. Siddiquee
(74) *Attorney, Agent, or Firm* — H.C. Park & Associates, PLC

(57) ABSTRACT

An apparatus for estimating the number of targets including a radar signal receiver configured to receive a radar signal that belongs to a detection signal transmitted by a radar and that is reflected by an object on the ground, and a controller configured to learn the number of targets by processing the received radar signal and to estimate the number of targets by processing a newly received radar signal based on the learned information.

10 Claims, 6 Drawing Sheets

APPARATUS AND METHOD FOR ESTIMATING NUMBER OF TARGETS

CROSS-REFERENCE TO RELATED APPLICATION

This application claims priority from and the benefit of Korean Patent Application No. 10-2019-0007997, filed on Jan. 22, 2019, which is hereby incorporated by reference for all purposes as if set forth herein.

BACKGROUND

Field

Exemplary embodiments relate to an apparatus and method for estimating the number of targets, and more particularly, to an apparatus and method for estimating the number of targets, which enable a radar for a vehicle to accurately estimate the number of target objects (i.e., targets).

Discussion of the Background

In general, a "radar for a vehicle" refers to various shapes of radar devices which may be mounted on a vehicle, and is used to prevent the occurrence of an accident attributable to poor weather conditions or a driver's carelessness and to detect an object around a vehicle.

Recently, as interest in safety and driver convenience increases, various vehicle safety and convenience technologies using such a radar device for a vehicle are developed.

For example, various technologies, such as a smart cruise technology for detecting a vehicle ahead of a vehicle being driven and automatically tracking the detected vehicle, an automatic driving technology, and an automatic emergency brake technology, are developed.

A radar for a vehicle which may be widely used in these technologies can detect a surrounding object using a reflection signal reflected after a radar signal is transmitted.

However, various vehicle safety and convenience technologies using such a radar device for a vehicle are basically based on that the radar for a vehicle can accurately estimate the number of targets. That is, the angle of a target can be accurately estimated only when the number of targets (i.e., target objects) is accurately estimated.

In a conventional technology, the estimation of the angle of a target is heavily researched, but research for accurately estimating the number of targets is insufficient.

The above information disclosed in this Background section is only for enhancement of understanding of the background of the invention and, therefore, it may contain information that does not constitute prior art.

SUMMARY

Exemplary embodiments of the present invention are directed to the provision of an apparatus and method for estimating the number of targets, which enable a radar for a vehicle to accurately estimate the number of target objects (i.e., targets).

In an embodiment, an apparatus for estimating the number of targets includes a radar signal receiver configured to receive a radar signal that belongs to a detection signal transmitted by a radar and that is reflected by an object on the ground, and a controller configured to learn the number of targets by processing the received radar signal and to estimate the number of targets by processing a newly received radar signal based on the learned information.

In an embodiment, the controller is configured to include a learning unit configured to learn the number of targets by processing the received radar signal and an estimation unit configured to estimate the number of targets by processing the newly received radar signal based on the learned information.

In an embodiment, the controller is configured to receive the already known number of targets and a corresponding angular spectrum and extract feature point information, and to learn the feature point information using a neural network (NN).

In an embodiment, a shape of the angular spectrum is specified based on the number of targets.

In an embodiment, the feature point information for a pre-designated major portion of the angular spectrum is specified in accordance with a shape of the angular spectrum.

In an embodiment, the controller is configured to identically set a range of an angle ($\theta$) and a weighting (W) when extracting an angular spectrum in a learning process and an estimating process.

In an embodiment, the controller is configured to extract, as the feature point information, at least one of an angle corresponding to the size and location of a greatest signal, angle information at a 3 dB smaller location from the greatest signal, an angle corresponding to the size and location of a side lobe, and angle information corresponding to the size and location of nulling, from the designated number of signals on each of both sides of the greatest signal of the angular spectrum.

In an embodiment, the controller is configured to parameterize the feature point information so that the feature point information is input to a neural network (NN) and to receive the parameterized feature point information and teach the parameterized feature point information to the NN.

In an embodiment, the controller is configured to receive angular spectrum of a radar signal whose number of targets is to be known and extract feature point information from the angular spectrum, identically apply, to the estimation unit, a weighting extracted in a learning process, and estimate the number of targets by inputting the weighting to the same NN as that used in the learning unit.

In an embodiment, a method of estimating the number of targets includes receiving, by a radar signal receiver, a radar signal that belongs to a detection signal transmitted by a radar and that is reflected by an object on the ground, and learning, by a controller, the number of targets by processing the received radar signal and estimating the number of targets by processing a newly received radar signal based on the learned information.

In an embodiment, the controller is configured to learn the number of targets by processing the received radar signal through a learning unit and to estimate the number of targets by processing the newly received radar signal based on the learned information through an estimation unit.

In an embodiment, in the learning of the number of targets, the controller is configured to receive the already known number of targets and a corresponding angular spectrum, extract feature point information, and learn the feature point information using a neural network (NN).

In an embodiment, a shape of the angular spectrum is specified based on the number of targets.

In an embodiment, the feature point information for a pre-designated major portion of the angular spectrum is specified in accordance with a shape of the angular spectrum.

In an embodiment, in the learning of the number of targets and the estimating of the number of targets, the controller is configured to identically set a range of an angle (θ) and a weighting (W) when extracting an angular spectrum.

In an embodiment, in order to extract the feature point information, the controller is configured to extract, as the feature point information, at least one of an angle corresponding to the size and location of a greatest signal, angle information at a 3 dB smaller location from the greatest signal, an angle corresponding to the size and location of a side lobe, and angle information corresponding to the size and location of nulling, from the designated number of signals on each of both sides of the greatest signal of the angular spectrum.

In an embodiment, when the feature point information is extracted, the controller is configured to parameterize the feature point information so that the feature point information is input to a neural network (NN) and to receive the parameterized feature point information and teach the parameterized feature point information to the NN.

In an embodiment, in the estimating of the number of targets, the controller is configured to receive angular spectrum of a radar signal whose number of targets is to be known and extract feature point information from the angular spectrum, identically apply, to the estimation unit, a weighting extracted in a learning process, and estimate the number of targets by inputting the weighting to the same NN as that used in the learning unit.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
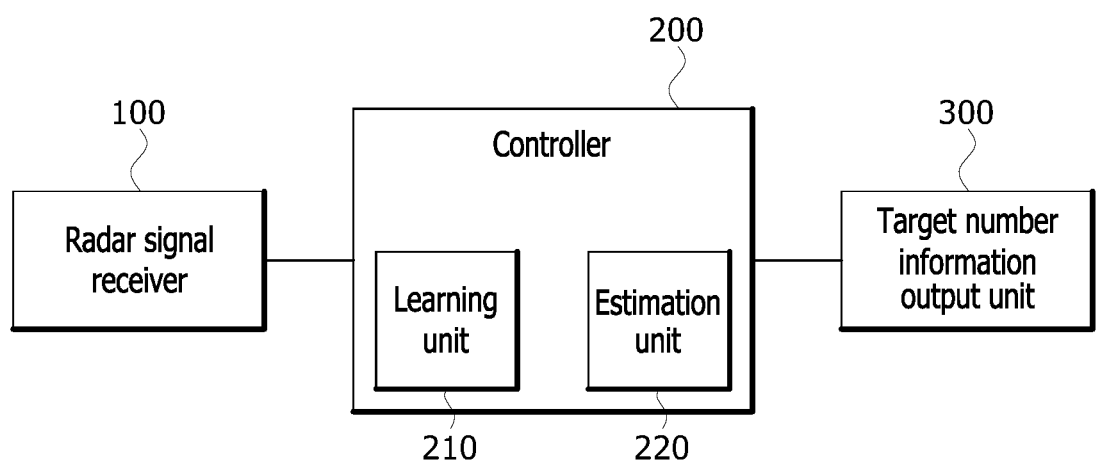
FIG. 1 is an exemplary diagram illustrating a schematic configuration of an apparatus for estimating the number of targets according to an embodiment of the disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus and method for estimating the number of targets will be described below with reference to the accompanying drawings through various examples of embodiments.

In such a process, the thickness of a line or the size of an element illustrated in the drawings may have been exaggerated for the clarity of a description and for convenience' sake. Terms to be described below have been defined by taking their functions in the present disclosure into consideration, and may be different depending on an operator's intention or practice. Accordingly, such terms should be interpreted based on overall contents of this specification.

FIG. 1 is an exemplary diagram illustrating a schematic configuration of an apparatus for estimating the number of targets according to an embodiment of the disclosure.

As illustrated in FIG. 1, the apparatus for estimating the number of targets according to the present embodiment includes a radar signal receiver 100, a controller 200, and a target number information output unit 300.

The radar signal receiver 100 receives a signal (hereinafter referred to as a "radar signal") that belongs to a detection signal transmitted by a radar (not illustrated) and that is reflected by an object on the ground.

The controller 200 learns the number of targets by processing the received radar signal, and estimates the number of targets by processing a newly received radar signal based on the learning.

The controller 200 includes a learning unit 210 for learning the number of targets by processing the received radar signal and an estimation unit 220 for estimating the number of targets by processing a newly received radar signal based on the learning. In the present embodiment, operations of the learning unit 210 and the estimation unit 220 are individually described for convenience' sake, but they may be described by being integrated into the controller 200.

The target number information output unit 300 outputs information on the number of targets estimated by the controller 200. For example, the target number information output unit 300 may estimate the angle of a target by performing an angular algorithm based on the estimated information on the number of targets.

Figure 2:
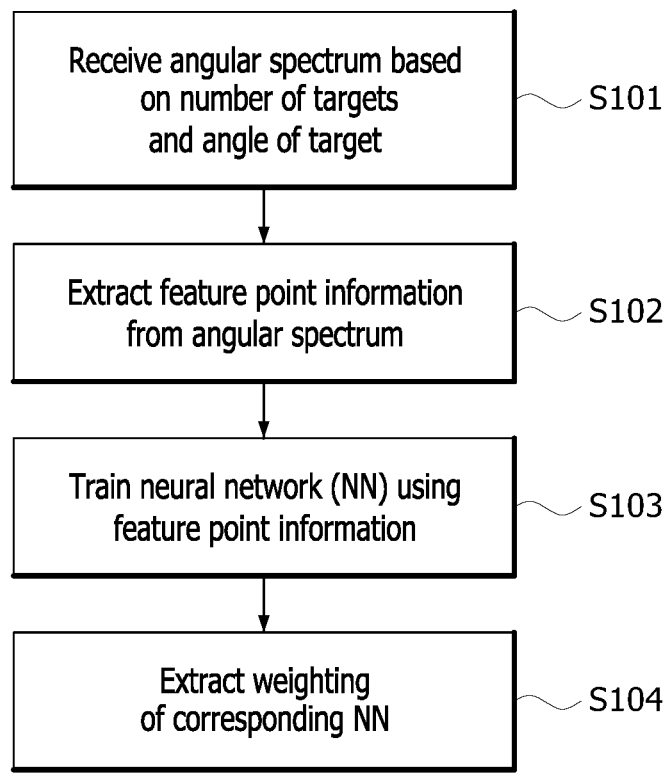
FIG. 2 is a flowchart for describing a detailed operation of a learning unit illustrated in FIG. 1.

FIG. 2 is a flowchart for describing a detailed operation of the learning unit 210 illustrated in FIG. 1.

Referring to FIG. 2, the learning unit 210 extracts feature point information by inputting the already known number of targets and a corresponding angular spectrum, and calculates the weighting of a neural network (hereinafter referred to as an "NN") by learning the feature point information (e.g., may learn the number of targets using an NN).

More specifically, the learning unit 210 receives an angular spectrum based on the number of targets and the angle of a target (S101).

In this case, the angular spectrum may be received using a digital beamforming scheme. In a conventional technology, only whether a target is located ahead (in the direction of a radar) and a direction (or angle) can be identified using the angular spectrum.

In contrast, in the present embodiment, the learning unit 210 extracts feature point information (i.e., feature point information of the angular spectrum corresponding to the number of targets) from the angular spectrum (S102), and learns the number of targets using the feature point information (S103) (e.g., may learn the number of targets using an NN).

In this case, an NN scheme for the learning of the feature point (i.e., the learning of the feature point information) may use any one of disclosed NNs including a feed-forward NN.

For reference, in the present embodiment, the angular spectrum has a different shape depending on the number of targets. Accordingly, a major portion of the angular spectrum has different feature point information (refer to FIG. 5). Accordingly, in the present embodiment, the number of targets is estimated by learning such feature point information.

In this case, when the angular spectrum is extracted, the range of an angle (θ) (e.g., in the range of −50 degrees to +50 degrees) and a weighting (W) are identically set so that learning and estimation can be performed based on the same criterion.

Figure 3:
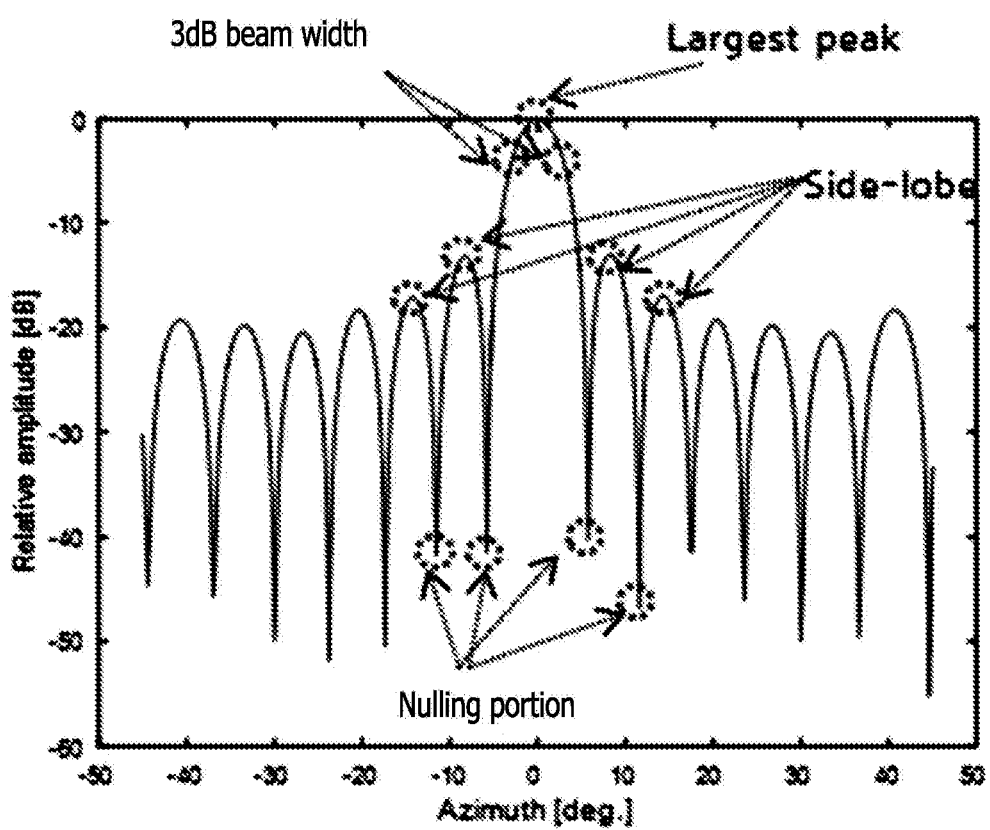
FIG. 3 is an exemplary diagram for describing feature point information of an angular spectrum in FIG. 2.

FIG. 3 is an exemplary diagram for describing feature point information of an angular spectrum in FIG. 2.

Referring to FIG. 3, feature point information (e.g., an angle (largest peak) corresponding to the size and location of a greatest signal, an angle corresponding to a 3 dB beam width, the angle and size of each side lobe, and the angle and size of nulling) is extracted from the designated number of signals on each of both sides of the greatest signal (e.g., two signals on each of the left and right sides).

Figure 4:
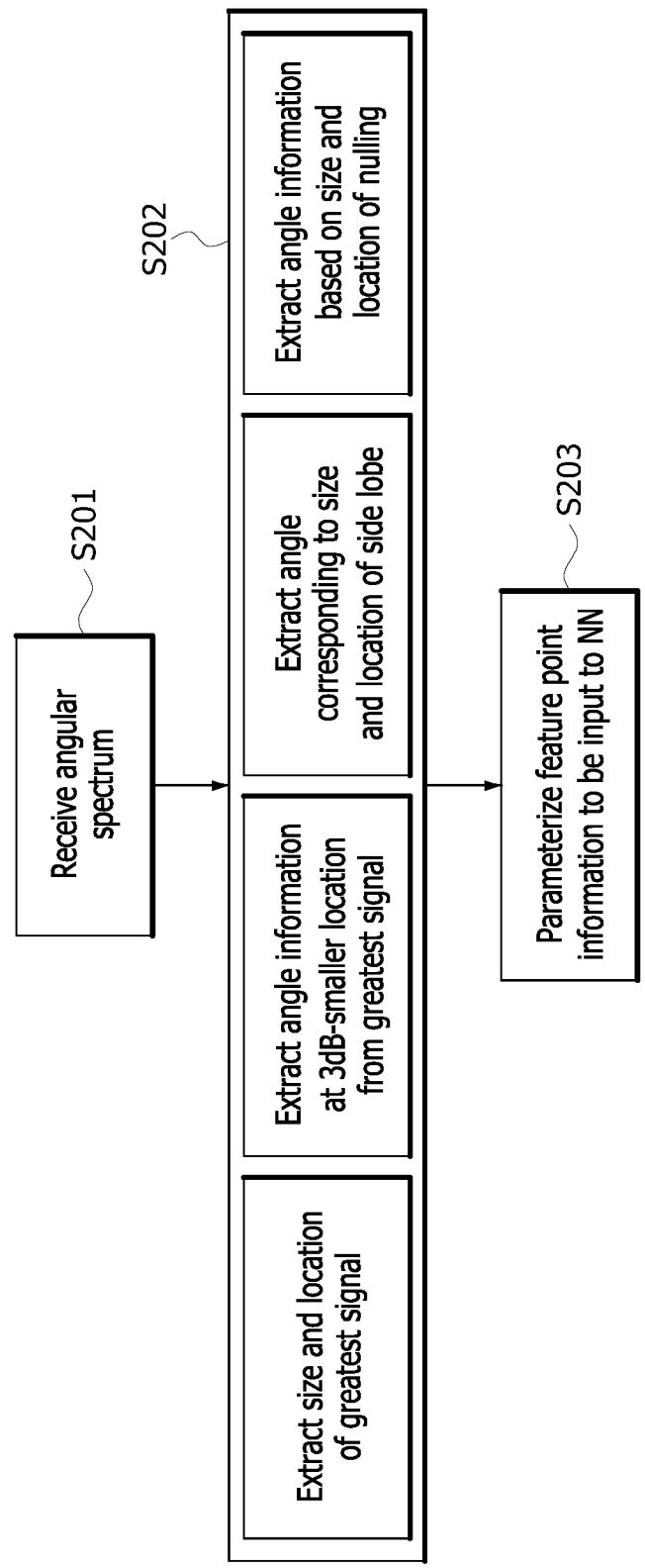
FIG. 4 is a flowchart for describing a process of extracting the feature point information in FIG. 3.

FIG. 4 is a flowchart for describing a process of extracting the feature point information in FIG. 3.

Referring to FIG. 4, when an angular spectrum is received (S201), the learning unit 210 extracts an angle, corresponding to the size and location of the greatest signal (i.e., an angle corresponding to a location), as feature point information, extracts angle information at a 3 dB-smaller location from the greatest signal, extracts an angle corresponding to the size and location of a side lobe (i.e., an angle corresponding to a location), and extracts angle information corresponding to the size and location of nulling (S202). Furthermore, the learning unit 210 parameterizes the extracted feature point information so that it is input to an NN (S203).

As a result, the learning unit 210 receives and learns feature point information parameterized to be input to the NN (e.g., may learn the number of targets using the NN).

Referring back to FIG. 2, when the learning unit 210 learns the feature point information, it extracts the weighting of a corresponding NN (S104).

This is for enabling learning and estimation to be performed based on the same criterion by allowing a trained weighting to be identically applied to the NN when the number of targets is estimated.

Figure 5:
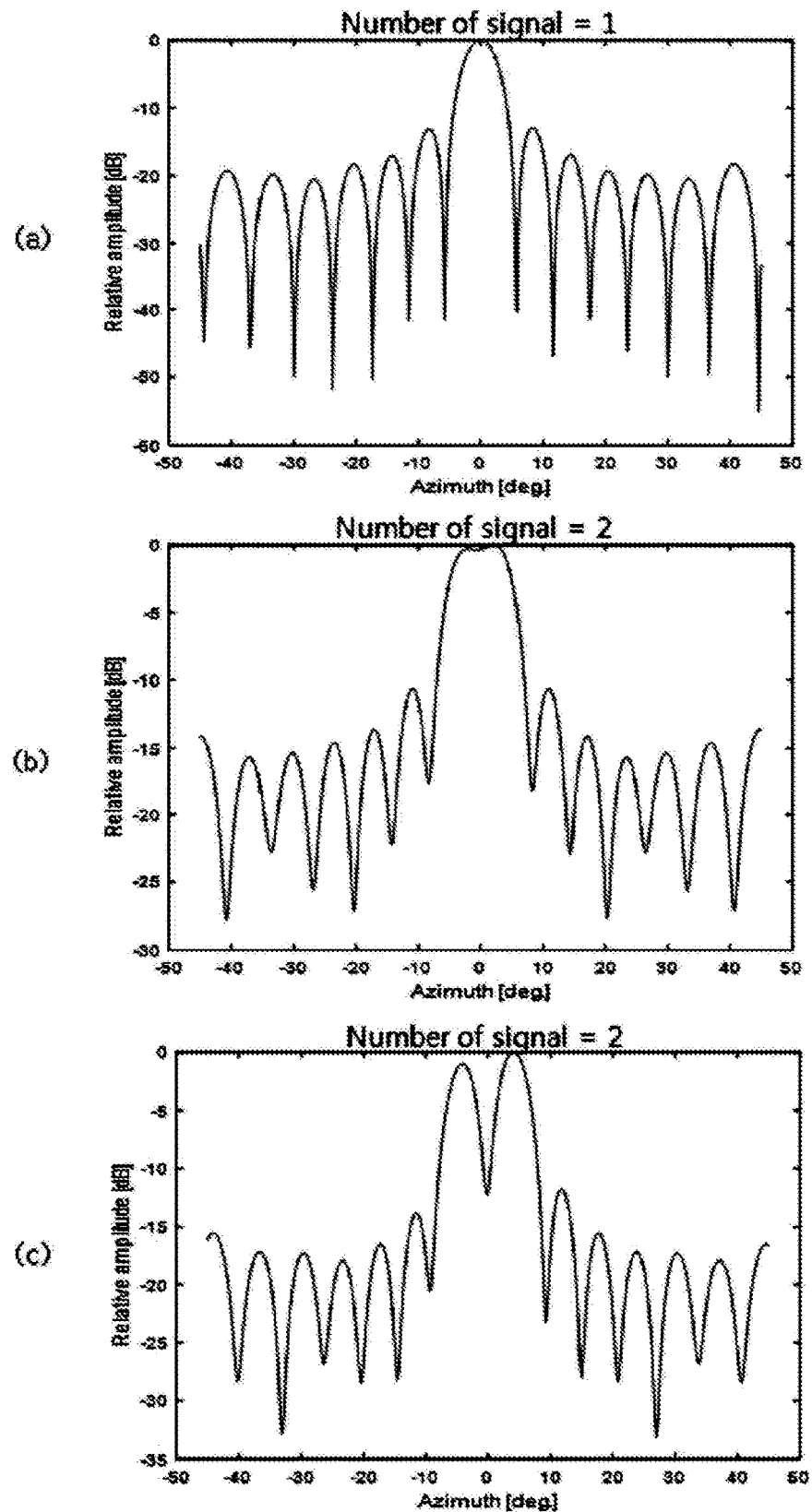
FIG. 5 is an exemplary diagram illustrating shapes of an angular spectrum corresponding to the number of targets in FIG. 2.

FIG. 5 is an exemplary diagram illustrating shapes of an angular spectrum corresponding to the number of targets in FIG. 2. For reference, the angular spectrum of FIG. 5 is an exemplary diagram illustrating an angular spectrum if antenna spacing=1λ and the number of array antennas is 9.

Referring to FIG. 5, the angular spectrum has a different shape (or form) depending on the number of targets. Accordingly, a major portion of the angular spectrum has different feature point information.

In this case, FIGS. 5(*b*) and 5(*c*) correspond to a case where the number of targets is 2 and need to have the same signal waveform. However, in FIGS. 5(*b*) and 5(*c*), the signal waveforms have generally similar shapes, but have different signal waveforms in detail. The reason for this is that the signal waveforms are different depending on resolution of a radar. This means that learning and estimation need to be differently performed for each vehicle radar.

Information (i.e., a shape and feature point information of each spectrum based on the number of targets) learned described above is stored in an internal database (not illustrated) or memory (not illustrated).

Figure 6:
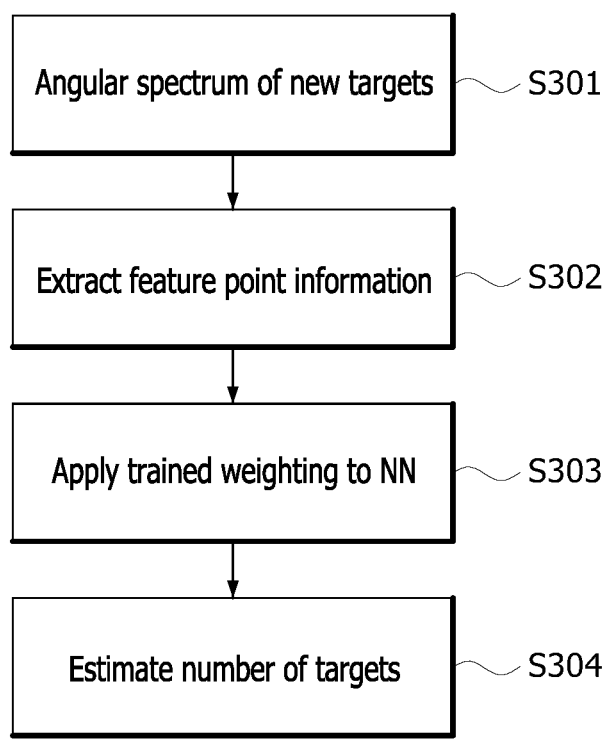
FIG. 6 is a flowchart for describing a detailed operation of an estimation unit illustrated in FIG. 1.

FIG. 6 is a flowchart for describing a detailed operation of the estimation unit 220 illustrated in FIG. 1.

Referring to FIG. 6, the estimation unit 220 receives an angular spectrum whose number of targets is to be known, extracts feature point information of the angular spectrum, applies a weighting, extracted by the learning unit 210, to the feature point information, and estimates the number of targets by inputting the feature point information to a corresponding NN.

More specifically, the estimation unit 220 receives an angular spectrum of new targets (i.e., targets whose number is to be estimated) (S301).

Furthermore, the estimation unit 220 extracts feature point information from the angular spectrum (i.e., feature point information of the angular spectrum corresponding to the number of targets) (S302).

Furthermore, the estimation unit 220 identically applies, to the estimation unit 220, a weighting extracted when the learning unit 210 previously learns the number of targets using feature point information (S303) (e.g., the estimation unit 220 may use the same NN as that used by the learning unit 210).

Accordingly, the estimation unit 220 estimates the number of targets, corresponding to the extracted feature point information, based on already learned information by applying the weighting (S304).

As described above, the present embodiment has effects in that it can accurately estimate the number of target objects (i.e., targets) through a radar for a vehicle and can accurately estimate the angle of a target based on the accurately estimated number of targets. Furthermore, there is an effect in that a false detection and non-detection probability can be reduced.

The present disclosure has been described above based on the embodiments illustrated in the accompanying drawings, but the embodiments are merely illustrative. A person having ordinary skill in the art to which the present disclosure pertains will understand that various modifications and other equivalent embodiments are possible from the embodiments. Accordingly, the technical range of protection of the present disclosure should be determined by the following claims. Furthermore, an implementation described in this specification may be realized as a method or process, apparatus, software program, data stream or signal, for example. Although the disclosure has been discussed only in the context of a single form of an implementation (e.g., discussed as only a method), an implementation having a discussed characteristic may also be realized in another form (e.g., apparatus or program). The apparatus may be implemented as proper hardware, software or firmware. The method may be implemented in an apparatus, such as a processor commonly referring to a processing device, including a computer, a microprocessor, an integrated circuit or a programmable logic device, for example. The processor includes a communication device, such as a computer, a cell phone, a mobile phone/personal digital assistant ("PDA") and another device, which facilitates the communication of information between end-users.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for estimating a number of targets, comprising:
   a radar signal receiver configured to receive a radar signal that belongs to a detection signal transmitted by a radar and that is reflected by an object on a ground; and
   a controller configured to learn the number of targets by processing the received radar signal and to estimate the number of targets by processing a newly received radar signal based on the learned information,
   wherein:
   the controller comprises:
      a learning unit configured to learn the number of targets by processing the received radar signal by using a neural network (NN); and
      an estimation unit configured to estimate the number of targets by processing the newly received radar signal based on the learned information;
   the controller is configured to:
      receive the already known number of targets and a corresponding angular spectrum and extract feature point information;
      learn the feature point information using the NN; and
      extract, as the feature point information, an angle corresponding to a size and location of a greatest signal, angle information at a 3 dB smaller location from the greatest signal, an angle corresponding to a size and location of a side lobe, and angle information corresponding to a size and location of nulling, from the designated number of signals on each of both sides of the greatest signal of the angular spectrum.

2. The apparatus of claim 1, wherein a shape of the angular spectrum is specified based on a number of targets.

3. The apparatus of claim 1, wherein the controller is configured to identically set a range of an angle (θ) and a weighting (W) when extracting an angular spectrum in a learning process and an estimating process.

4. The apparatus of claim 1, wherein the controller is configured to:
   parameterize the feature point information so that the feature point information is input to the NN; and
   receive the parameterized feature point information and teach the parameterized feature point information to the NN.

5. The apparatus of claim 1, wherein the controller is configured to:
   receive an angular spectrum of a radar signal whose number of targets is to be known and extract feature point information from the angular spectrum;
   identically apply, to the estimation unit, a weighting extracted in a learning process; and
   estimate the number of targets by inputting the weighting to the NN.

6. A method of estimating a number of targets, comprising:
   receiving, by a radar signal receiver, a radar signal that belongs to a detection signal transmitted by a radar and that is reflected by an object on a ground; and
   learning, by a controller, a number of targets by processing the received radar signal and estimating a number of targets by processing a newly received radar signal based on the learned information,
   wherein:
   the controller is configured to:
      learn the number of targets by processing the received radar signal through a learning unit by using a neural network (NN); and
      estimate the number of targets by processing the newly received radar signal based on the learned information through an estimation unit;
   in the learning of the number of targets, the controller is configured to receive an already known number of targets and a corresponding angular spectrum, extract feature point information, and learn the feature point information using the NN; and
   in order to extract the feature point information, the controller is configured to extract, as the feature point information, an angle corresponding to a size and location of a greatest signal, angle information at a 3 dB smaller location from the greatest signal, an angle corresponding to a size and location of a side lobe, and angle information corresponding to a size and location of nulling, from a designated number of signals on each of both sides of the greatest signal of the angular spectrum.

7. The method of claim 6, wherein a shape of the angular spectrum is specified based on the number of targets.

8. The method of claim 6, wherein in the learning of the number of targets and the estimating of the number of targets, the controller is configured to identically set a range of an angle (θ) and a weighting (W) when extracting an angular spectrum.

9. The method of claim 6, wherein when the feature point information is extracted, the controller is configured to:
   parameterize the feature point information so that the feature point information is input to the NN, and
   receive the parameterized feature point information and teach the parameterized feature point information to the NN.

10. The method of claim 6, wherein in the estimating of the number of targets, the controller is configured to:
    receive angular spectrum of a radar signal whose number of targets is to be known and extract feature point information from the angular spectrum, identically apply, to the estimation unit, a weighting extracted in a learning process, and
estimate the number of targets by inputting the weighting to the NN.

* * * * *